Patented July 31, 1951

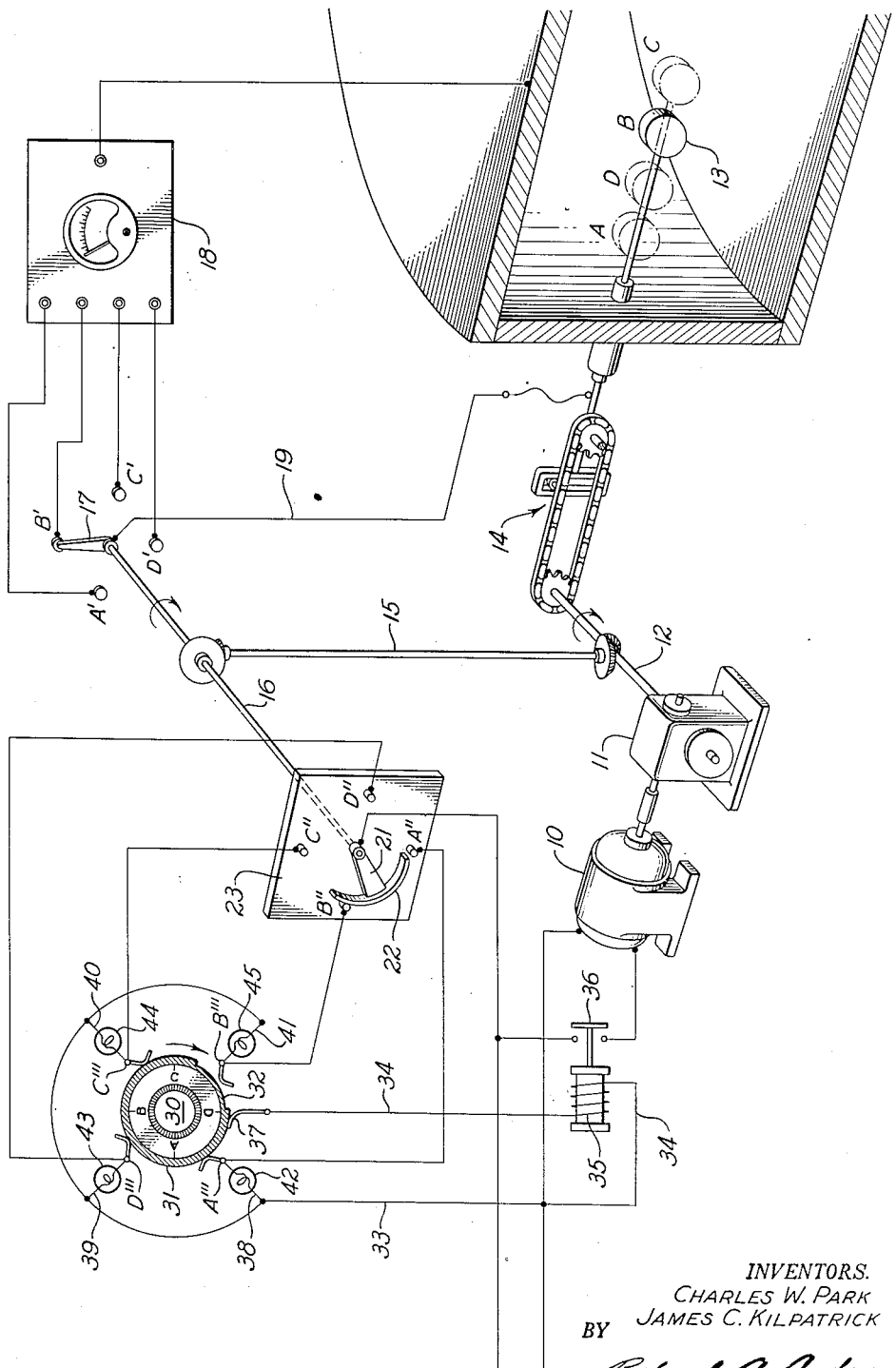
July 31, 1951  C. W. PARK ET AL  2,562,637
POSITION INDICATING CONTROL APPARATUS
Filed Aug. 10, 1949
INVENTORS.
CHARLES W. PARK
JAMES C. KILPATRICK
BY
Roland A. Anderson
ATTORNEY.

2,562,637

UNITED STATES PATENT OFFICE 2,562,637

POSITION INDICATING CONTROL APPARATUS

Charles W. Park, Oakland, and James C. Kilpatrick, Berkeley, Calif., assignors to the United States of America as represented by the United States Atomic Energy Commission Application August 10, 1949, Serial No. 109,574

1 Claim. (Cl. 177—311)

This invention relates to electrical circuit control apparatus and more particularly to an improved apparatus providing a remote control action together with improved means indicating the accomplishment of that control action. While the invention will be found to be adaptable to widespread usage in many fields, it has been found to be especially useful for changing scales on an electrometer during operation of a cyclotron.

Heretofore many different arrangements have been employed for effecting control of the setting of a remote unit by use of electrical circuits, either alone or in combination with mechanical, hydraulic, or other power transmission means. In addition, some of these systems have provided means for indicating at the control station the position assumed by the controlled unit. However, so far as known, each such combination has required a more or less complex wiring arrangement for the accomplishment of these desired ends. It therefore is one object of my invention to provide an improved electrical circuit control apparatus having a simplified wiring circuit. Another object is to provide a control apparatus wherein the actuating means for positioning a driven work element also serves to position a member of the apparatus controlling said actuating means.

Another object is to provide an improved combination of switches and contact terminals in the controlled and control units of electrical control apparatus. A further object is to provide an improved combination of indicating means to show the positions assumed by the work element or elements.

Another object is to provide an improved means for changing the scales of an electrometer used in conjunction with a particle accelerator.

Still another object is to provide an improved means for changing the positions of probe targets used in conjunction with a particle accelerator.

Other objects and advantages of the invention will become more apparent when considered in connection with the following description and the accompanying diagrammatic drawing. While the preferred arrangement of apparatus disclosed herein has been found to be especially suitable in connection with the remote control of accessories associated with a particle accelerator, such as a cyclotron, it will be obvious to those skilled in the art that various other uses may be employed without departing from the broader aspects of our invention.

Referring now to the drawing, a suitable source of electrical power is connected through the improved control apparatus, later to be described, with a motor 10 serving the dual function of actuating the primary means to be positioned, defined herein as the work element, and also of actuating a portion of the control apparatus. This motor may be of a suitable self-starting, unidirectional type and through a gear reducer 11 may drive a shaft 12 which in turn drives any desired work element whose position at any given time is to be accurately known. For example, one such work element, schematically shown, may comprise a probe target 13 adapted to be positioned at one of a plurality of positions, here indicated as A, D, B and C, within the evacuated casing of a particle accelerator, such as a cyclotron. By means of a suitable mechanical means generally shown at 14, the rotary motion of shaft 12 may be converted into a translatory motion of the target. Through use of suitable gearing, primarily to give a desired speed of rotation, shaft 12 also drives a second shaft 15 which by means of any desired gearing drives a third shaft 16. As a further example of a work element driven by motor 10 and whose position at any given time is to be accurately indicated, a contact arm for establishing connections to a conventional electrometer is schematically illustrated. Such a contact arm 17 driven by shaft 16 and electrically connected by a slip ring to a suitable conductor 19 is adapted to make contact with a selected terminal, A', B', C' or D', leading to the several scales of an electrometer 18. In one convenient arrangement the electrometer may be connected at one side to the casing of the particle accelerator and conductor 19 may be connected to probe target 13 whereby currents received by such target at its several positions may be appropriately read upon the electrometer. As will be apparent, conductor 19 may be connected to the target 13 by a suitable, flexible means accommodating the longitudinal target movement and suitable insulation of the connections from both the casing and the mechanical parts of means 14 is provided. Likewise, contact arm 17 preferably is suitably insulated from shaft 16. Although the arrangement as thus described illustrates the conjoint operation of both the rotary electrometer scale changing means and the longitudinally movable probe target it will be apparent that these work elements may be driven separately or be independently connected to other desired structure without departing from the broader aspects of our invention. Likewise either or both of the driven elements may have suitable means (not shown) for disconnecting the same from the drive shafts 16 or 12, respectively.

In addition to driving a work element serving a specific use, such as exemplified by elements 13 and 17, motor 10 is non-detachably connected to and drives a rotatable, electrically conductive switch arm 21 which preferably is rigidly attached to shaft 16 in any suitable manner. As will be noted, switch arm 21 forms an essential part of a seeking switch in the controlled unit of the apparatus and is adapted to operate sequentially with respect to a control unit later to be described.

By means of a conventional slip ring and suitable means for insulating switch arm 21 from shaft 16, said arm by means of an appropriate conductor, is constantly in communication with one side of the power source. At its outer extremity the rotatable switch arm 21 may carry a suitable resilient contact 22 here shown in the form of an arcuate member adapted to contact a selected terminal post mounted upon a panel 23. The number of terminal posts provided upon this controlled unit correspond to the number of positions or stations which may be selected for the driven work element or elements, shown in this illustration as A'', B'', C'' and D''. While contact 22 preferably is of a size permitting simultaneous temporary contact during its movement with two adjacent terminal posts, in a manner later to be explained, it is to be noted that it contacts only one terminal post in its rest position.

Considering now the unit for controlling the operation of the apparatus described above, a manually operable knob 30 affixed in any suitable insulated manner to the adjustable conductive switch body 31 serves to provide a desired setting of the apparatus. Along a portion of the periphery of said switch body a cutaway section 32 comprising an open circuit section of the controlling unit is located. A series of resilient contact members attached to terminal posts, designated A''', B''', C''' and D''', are adapted to bear at all times against the body 31 except when the cutaway section 32 is adjacent a given contact member, at which time no contact between such member and the switch body 31 is possible. The controlling unit is located customarily at a remote position from the controlled unit and its terminal posts corresponding in number to the terminal posts on the controlled unit are connected thereto in series by appropriate conductors.

Leading from the side of the power source, opposite to the side to which switch arm 21 is permanently connected, are two parallel conductors 33 and 34. Conductor 34 provides a winding for a conventional solenoid 35 having a relay contact 36 and terminates in a resilient contact 37 adapted to bear at all times against the switch body 31 of the controlling unit. Conductor 33 on the other hand connects to a series of parallel leads 38, 39, 40, and 41 extending through separate indicating means 42, 43, 44, and 45 to the separate terminal posts of the controlling unit. While the several indicating means are here shown as lamps adapted to be illuminated, it is obvious that any other suitable indicators or signals could be employed without departing from our invention.

In operation the apparatus may be employed according to the following as an example. Assuming the electrometer scale and probe target to be at their respective stations B' and B, the indicating lamp 45 to be lighted, and the motor 10 to be at rest, all as shown, it is desired to move the electrometer scale and target to the corresponding stations D' and D and to indicate when this change is accomplished. The operator then moves knob 30 until the open circuit section 32 breaks contact with the contact of terminal post D'''. At this time contact 22 of switch arm 21 is still in contact with terminal post B''. Current immediately flows in parallel through conductors 33 and 34 to switch body 31, and since the contact member corresponding to terminal post B''' is now resting against the switch body 31 current also flows to terminal post B'' on the controlled unit, thence through seeking switch arm 21 and thence back through the circuit. As a result of this closed circuit solenoid 35 is energized, relay 36 is closed, and motor 10 starts to turn. As the motor actuates the drive shafts 12, 15 and 16, the arcuate contact 22 progressively touches terminal B'', C'' and then terminal D'' on the controlled unit. Meanwhile the electrometer arm 17 moves to its station D' and the target 13 simultaneously moves to its station D. As soon as contact 22 leaves terminal C'', however, it is in contact only with terminal D'' and at this instant the connection between the controlling unit and the controlled unit is broken in view of the fact that the resilient contact member from terminal D''' on the controlling unit does not touch the switch body 31. Current nevertheless continues to flow through conductor 33, lead 39, indicator 43, and the conductor extending to terminal D'' on the controlled unit, whereby the indicator 43 is actuated and remains actuated showing that the switch arm 22 is resting upon its terminal D''. Such actuation of the indicator 43 also shows that the driven elements are at their stations D and D' due to the mechanical linkages with said switch arm 22.

At this time current no longer flows through the parallel conductor 34 or through the solenoid 35, and thus motor 10 no longer receives current. By adjustment of the braking action of the shafts driven by the motor 10 and by proportioning of the size of the contact strip 22 so that while in motion it can touch two terminals simultaneously for an instant, but due to its momentum cannot stop instantly, the possibility of the moving parts of the apparatus stopping on dead center is eliminated.

As will thus be apparent, the sequential operation of first setting a controlling unit and then driving a motor which not only actuates driven work members but also actuates a controlled unit which in turn controls the motor itself, results in a simple and compact control apparatus. At the same time, indicating means are provided at a location where no additional wiring is needed therefor, and such means are adapted to function when and only when a movement of the controlled apparatus has been accomplished.

While the invention has been disclosed for use in conjunction with the operation of auxiliaries of a cyclotron wherein remote control and positive positioning are essential requirements, it will be clear that it is in no way limited to this sole usage. Numerous modifications of the described apparatus therefore may be made within the spirit and scope of our invention and it is not desired to limit the invention to the exact details shown except insofar as they may be defined in the following claim.

What is claimed is:

A position indicating control apparatus comprising in combination, a probe target for a particle accelerator adapted to be moved to a selected position and to indicate its arrival thereat, a power source, a solenoid, a relay actuated thereby, an actuating means for said target connected to said power source through said relay, an adjustable controlling unit having parallel connections to one side of the power source, a plurality of indicating means connected in parallel to one of said parallel connections, another of said parallel connections being through said solenoid, a controlled unit connected to the power source in series with said controlling unit, an electrometer scale changing means in driven relation with said actuating means, and a movable switch in said controlled unit, said switch being driven by said actuating means, whereby movement of the controlling unit to a predetermined position establishes a limited application of power to said actuating means and sequential movement of the switch to a corresponding position interrupts the application of power thereto and actuates said scale changing means corresponding to the position at which the element is located at the time of such interruption of power.

CHARLES W. PARK.
JAMES C. KILPATRICK.

REFERENCES CITED

The following references are of record in the file of this patent:

UNITED STATES PATENTS

| Number | Name | Date |
|---|---|---|
| 2,018,364 | Jensen | Oct. 22, 1935 |
| 2,410,842 | Scholz | Nov. 12, 1946 |

FOREIGN PATENTS

| Number | Country | Date |
|---|---|---|
| 11,881 | Great Britain | of 1899 |